(No Model.)
A. WORTHINGTON.
GAGE COCK.
No. 409,263. Patented Aug. 20, 1889.
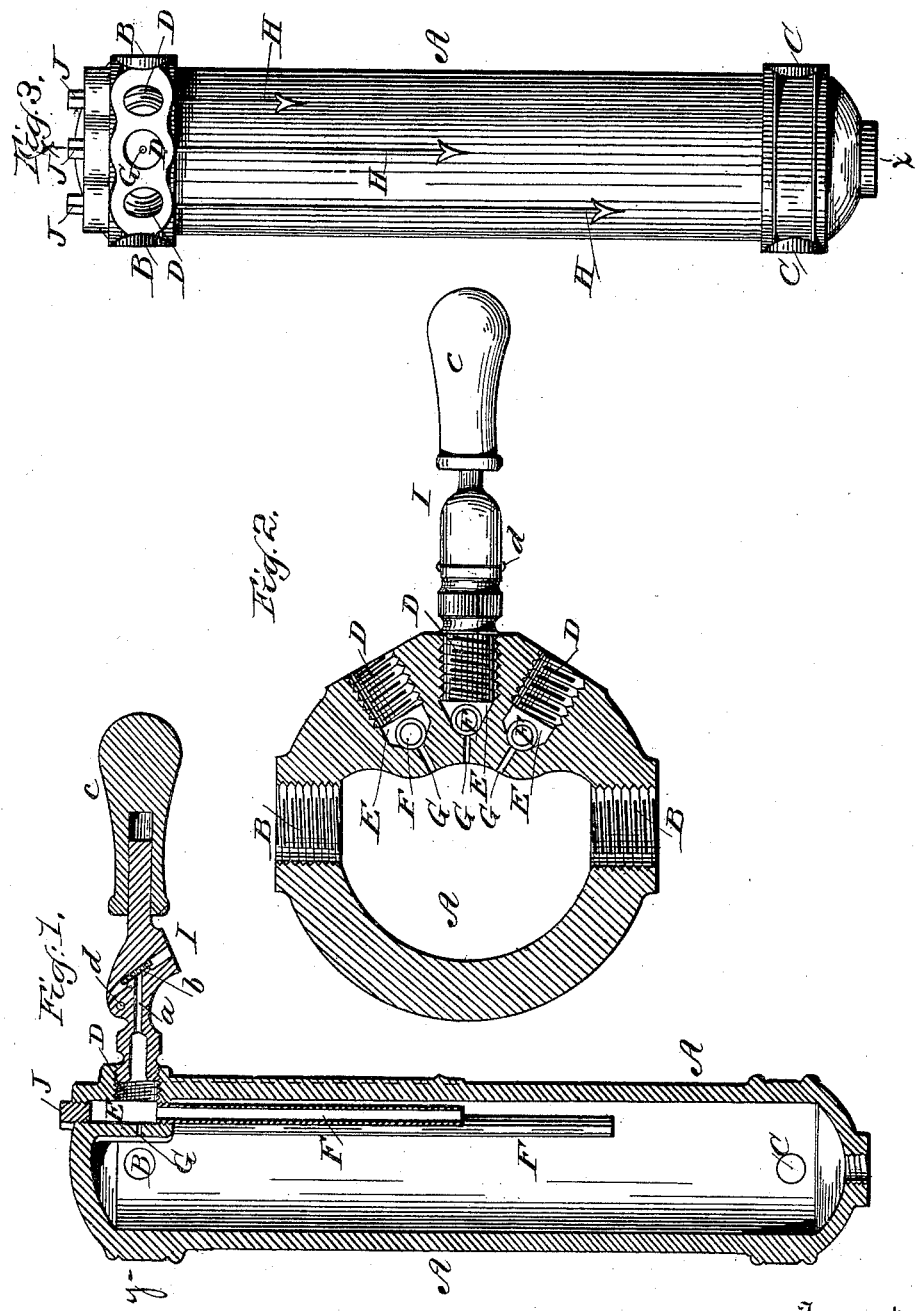
Witnesses
Ira R. Steward
Henry F. Parker
Inventor
Amasa Worthington
By his Attorney
Chas. W. Forbes

UNITED STATES PATENT OFFICE.

AMASA WORTHINGTON, OF BROOKLYN, NEW YORK.

GAGE-COCK.

SPECIFICATION forming part of Letters Patent No. 409,263, dated August 20, 1889.

Application filed October 4, 1888. Serial No. 287,225. (No model.)

*To all whom it may concern:*

Be it known that I, AMASA WORTHINGTON, a citizen of the United States, residing at Brooklyn, in the county of Kings and State of New York, have invented certain new and useful Improvements in Gage-Cocks, of which the following is a specification.

My invention relates to the arrangement and manner of connecting gage-cocks of any well-known or suitable pattern to a steam-boiler or stand-pipe connecting therewith, or to any closed vessel wherein a portion of liquid and a portion of gaseous fluid are carried under pressure, and it is desired to ascertain the level of the liquid by testing outflow-passages for the same at different levels.

The object of my invention is to overcome the objectionable feature, met with in practice, of the leakage and dripping of the liquid through the gage-cocks that are located below the normal liquid-level.

To this end my invention consists in locating all of the gage-cocks at a level above that attained by the liquid, and connecting them with the different levels within the vessel to which their respective tests are applied by means of downwardly-extending passages or pipes through which the liquid is forced, but which passages are supplied at their portions adjacent to the gage-cocks and intermediate to the latter and the liquid-level with the steam or other vaporous fluid at the intervals while the cocks are closed.

Referring to the accompany drawings, forming a part of this specification, Figure 1 is a vertical section on the line *x x*, Fig. 3, of the device applied to a stand-pipe of a steam-boiler; Fig. 2, a horizontal cross-section, enlarged, on the line *y y*, Fig. 1; and Fig. 3, a front elevation on the same scale as Fig. 1.

The stand-pipe A is adapted to be connected, by means of suitable pipes attached to its openings B and C, with points respectively above and beneath the water-level, say, of a steam-boiler, and the said stand-pipe is situated vertically with relation to the water-level in the boiler, whereby its height embraces the limits of usual variation of the water-level. Adjacent to the top of the stand-pipe A, I connect the several gage-cocks to the openings D in a common horizontal plane. For convenience with relation to the stand-pipe, the openings D radiate horizontally from the center of the chamber within, so as to concentrate the internal parts of the device and to locate the gage-cocks at a convenient distance apart externally for operating them. There are a series of chambers E, to which the openings D severally communicate, and to these chambers E are affixed depending tubes F, that extend to the different test-levels within the stand-pipe A, and communicate therefrom to the said respective chambers.

The chambers E have a direct communication also with the steam-space above the water-level by means of passages G through the walls of the chambers, to which passages a limited capacity is given for the admission of steam.

Upon the exterior of the stand-pipe A, I employ any convenient means of indication—such as the arrow-terminated lines H—to mark the points of level at which the corresponding tubes F terminate internally.

Gage-cocks I of any suitable construction may be employed; but I have shown a form of construction which has a straight-way passage *a*, closed at the seat *b* thereof by the weighted valve-handle *c*, fulcrumed at *d*. A convenient feature in the employment of this form consists in the location opposite to said straight-way passage *a* of the passage G, thereby facilitating the cleaning of the latter, should it become necessary, by the insertion of a suitable wire or instrument. The cleaning of the tubes F, should it be required, is also facilitated by the location opposite their upper ends of the screw-plugs J, which may be removed, permitting access through the chambers E for the purpose.

In operation the water in the tubes F normally stands at the level of that surrounding the tubes, due to the access of the steam through the passages G when the cocks are closed. Upon opening the cocks the cramped passages G, being of less capacity than that of the outflow-passages of the cocks, necessitate the delivery to occur through the tubes F, forcing the water up to the level of the cocks and covering the said passages G during the operation of outflow. Upon again closing the cocks the water in the tubes F resumes its level, the steam filling the chambers E through the passages G, whereby the gage-cocks are normally exposed to the steam-space. Any leakage that may occur will hence issue only from the dry steam, and, the quantities being small, will at once evaporate into the atmosphere and avoid dripping or condensing.

It will be understood that the device is equally applicable in direct connection with the head or other part of the shell of a steam-boiler, steam-drum, or other vessel. In its application to a flat surface—as of a boiler-head—the openings may be parallel, rather than convergent horizontally, and can be placed at any desired horizontal distance apart. The chambers E may in such instance be composed of separate pieces—such as pipe-elbows or a modification of the same, nippled through the boiler-plate or otherwise suitably secured and connected with the gage-cocks and with the depending pipes. The position of the gage-cocks need not necessarily be limited to a common plane of level, as is illustrated, but may be more or less varied vertically, as circumstances require, the lowermost being above the water-level. The tubes F, moreover, may be located externally to the vessel, entering the same at their lower ends at the various desired levels, and communicating at their upper portions by separate tubes with the steam-space.

I therefore claim, broadly, as my invention—

1. The combination, with a gage-cock located above the maximum liquid-level of a vessel wherein liquid is contained under pressure, of a downwardly-extending passage communicating between said gage-cock and the said vessel at a level occupied by said liquid, and of an independent passage communicating between said gage-cock and the said vessel at a level above that occupied by said liquid, said independent passage having a capacity minor to that of the said gage-cock and that of the said downwardly-extending passage, the whole adapted to operate as set forth.

2. The combination of a plurality of gage-cocks located above the maximum liquid-level of a vessel wherein liquid is contained under pressure, downwardly-extending passages severally communicating between said gage-cocks and the said vessel at a designated series of different levels in the range of variation of the liquid-level, and independent passages severally communicating between said gage-cocks and the said vessel at a level or levels that are above that occupied by said liquid, each said independent passage having a capacity minor to that of the gage-cock to which it connects and to that of the downwardly-extending passage to which it connects, the whole adapted to operate as set forth.

3. The combination, with a gage-cock located above the maximum liquid-level of a vessel wherein liquid is contained under pressure, of a chamber projecting within the vessel opposite the gage-cock and to which the latter connects, a depending tube extending from said chamber to a testing-point in the range of variation of the liquid-level, and a passage connecting said chamber with the space above the maximum liquid-level, said passage having a capacity minor to that of the said gage-cock or of the said depending tube, and adapted for the purposes set forth.

4. The combination, with a vertical stand-pipe connected at its upper and lower portions, respectively, with the gaseous and the liquid spaces of a vessel containing liquid under pressure and located horizontally opposite to and including the range of variation to which the liquid-level is subject, of gage-cocks severally connected with chambers within said stand-pipe above the maximum liquid-level, depending tubes severally communicating from said chambers to various testing-points in the range of variation of the liquid-level, and the described passages of minor capacity connecting said chambers severally with the space above the liquid, arranged as and for the purposes described.

5. The combination, with the herein-described stand-pipe, of a plurality of gage-cocks extending radially in a common horizontal plane from a concentrated series of chambers located within the upper portion of said stand-pipe, depending tubes severally communicating from said chambers to various testing-points in the range of variation of the liquid-level, and the cramped passages connecting said chamber severally with the interior of the stand-pipe located in line with the radiating passages of the gage-cocks, as and for the purposes specified.

AMASA WORTHINGTON.

Witnesses:
C. W. FORBES,
HENRY F. PARKER.